3,274,275
METHOD FOR PRODUCTION OF CYCLOHEXANE
John F. Hutto, Ray D. Garlington, and John T. Cabbage, Bartlesville, Okla., assignors to Phillips Petroleum Company, a corporation of Delaware
Filed Nov. 26, 1963, Ser. No. 326,120
7 Claims. (Cl. 260—667)

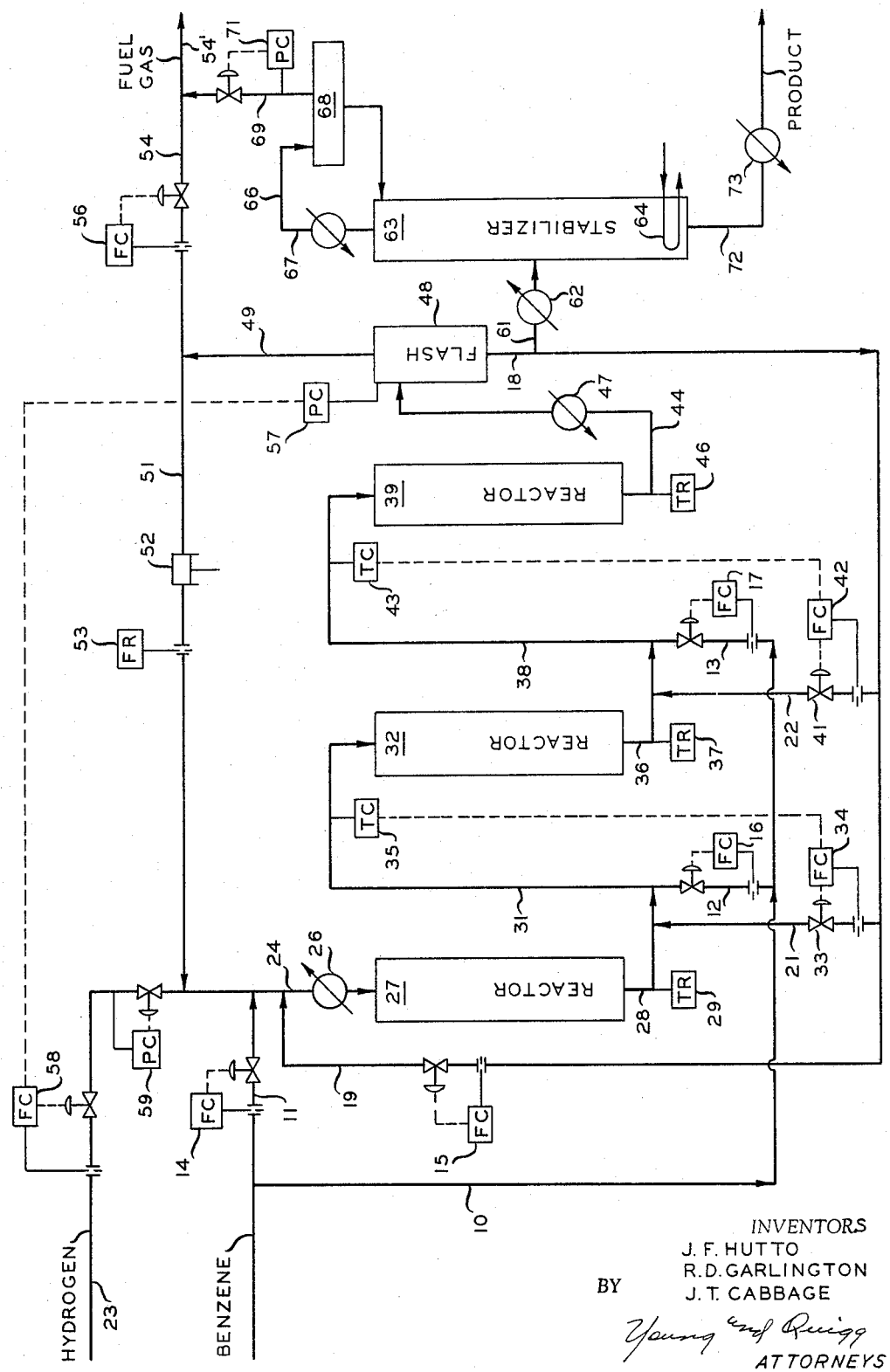

This invention relates to a method and an apparatus for the production of cyclohexane.

The hydrogenation of benzene to produce cyclohexane is a well known reaction wherein one mol of benzene is reacted with 3 mols of hydrogen in the presence of a suitable hydrogenation catalyst to form one mol of cyclohexane. The reaction is strongly exothermic, liberating 89,500 B.t.u.'s per pound mol of cyclohexane formed. This creates serious problems in carrying out the reaction on a commercial scale. When the operation is carried out adiabatically on a feed stream containing more than relatively small amounts of benzene, the resulting temperature increase on the process stream can be so great that it cannot be tolerated because of equipment limitations and, more seriously, process difficulties such as loss of catalyst activity and the occurrence of side reactions. One side reaction which must be avoided at all costs is a demethylation-hydrogenation reaction which results in runaway temperatures.

In the past, attempts have been made to solve this problem in various ways such as by reducing the concentration of benzene in the feed stream charged to the hydrogenation reactor, reducing the inlet temperature on said feed stream, and by employing reactors provided with elaborate cooling means, either as interstage cooling in systems employing a plurality of reactors or elaborate internal cooling means in systems wherein only one reactor is employed. In some instances, it has been proposed to employ both interstage cooling between reactors and internal cooling means in those systems employing a plurality of reactors. Such complicated cooling means are expensive to buy and maintain and, in general, leave much to be desired. When the concentration of benzene in the feed stream is decreased, there is obviously a decrease in unit capacity. Similarly, when the temperature on the inlet feed stream to the reactor is reduced, there is usually obtained a decrease in efficiency of the process. Thus, few, if any, of the methods employed in the prior art for solving the problem have been entirely satisfactory.

When employing presently known catalysts, we have found that the temperature on the inlet feed stream to the hydrogenation zone (initial reaction temperature) should not be less than about 300 to about 400° F. in order to obtain a reasonable reaction rate. In order to prevent the above-mentioned demethylation-hydrogenation reaction and other undesirable side reactions, we have found that the temperature on the effluent from the hydrogenation zone (final reaction temperature) should not be greater than about 450 to about 600° F., preferably not greater than about 550° F. Thus, the maximum desirable increase in temperature of the process stream across a reactor is about 300° F., preferably about 150 to 200° F. We have now discovered that the process can be operated within the limits of said 200° F. increase in temperature by passing individual portions of the benzene feed stream and individual portions of a cyclohexane diluent stream in parallel into individual reactors of a plurality of reactors, passing all of the hydrogen through said plurality of reactors in series, and regulating the amount of said cyclohexane diluent thus introduced into said reactors to control the temperature therein so that the temperature in each of said reactors does not exceed about 600° F. We have found that by operating in this manner excellent temperature control can be obtained and at the same time the overall efficiency of the process is markedly increased.

Thus, in one broad aspect, in a process for the catalytic hydrogenation of benzene to produce cyclohexane, the present invention resides in the improvement of operating a plurality of reactors in parallel with respect to individual portions of the benzene feed stream and individual portions of a cyclohexane diluent stream, but in series with respect to the hydrogen stream; and an improved apparatus for carrying out said hydrogenation process.

An object of this invention is to provide an improved process for the hydrogenation of benzene. Another object of this invention is to provide an improved process for the production of pure cyclohexane by the hydrogenation of pure benzene. Still another object of this invention is to provide a method for controlling the temperature in the individual reaction zones of a process for the hydrogenation of benzene to cyclohexane, said process being carried out in a plurality of reaction zones. Another object of this invention is to provide an improved apparatus for controlling the temperature in the individual reactors of a system for the hydrogenation of benzene to cyclohexane, said system employing a plurality of reactors. Other aspects, objects, and advantages of the invention will be apparent to those skilled in the art in view of this disclosure.

According to the invention, there is provided a process for the production of cyclohexane, which process comprises: contacting a mixture comprising benzene, hydrogen, and cyclohexane diluent with a hydrogenation catalyst under hydrogenating conditions in a plurality of contacting zones, said hydrogen being passed in series flow through each of said contacting zones, individual portions of said benzene being passed in parallel into individual contacting zones of said plurality of contacting zones, and individual portions of said cyclohexane diluent being passed in parallel into individual contacting zones of said plurality of contacting zones; and regulating the amount of cyclohexane diluent thus supplied to each of said contacting zones to control the temperature therein so that the temperature in each of said contacting zones does not exceed about 600° F.

Further according to the invention, there is provided an improved apparatus for the hydrogenation of benzene to cyclohexane in a plurality of reactors, said apparatus including means for controlling the temperature within the individual reactors of said plurality of reactors.

In the practice of the invention the only cooling obtained between the plural reaction zones, e.g., between the first and second reactors and between said second and the third reactor, is that which is obtained as the result of the addition of the individual portions of cyclohexane diluent and/or the individual portions of benzene feed stream to the individual reactor effluents before charging same to the succeeding reactor. Said added streams serve to absorb the heat of reaction imparted to the process stream in the preceding reactor. Thus, when operating in accordance with the invention the elaborate cooling means of the prior art such as intermediate coolers on the process stream between the several reactors and/or elaborate internal cooling means within the reactors are eliminated. The method of operating in accordance with the invention provides a great advantage in combining the total cooling on the process stream into a single final cooler following the last reactor in the series of reactors. This eliminates the cost of installing and maintaining the several intermediate coolers and/or complex internal cooling means of the prior art.

The invention is particularly suitable for the hydrogenation of benzene feed streams having a high concentration of benzene, e.g., 90 weight percent or greater. However, benzene feed streams of lower concentration can also be hydrogenated in accordance with the invention. Since the purity of the cyclohexane product is dependent upon the purity of the benzene feed stream, as explained further hereinafter, it is frequently preferred that said benzene feed stream contain at least 99 weight percent benzene, more preferably at least 99.5 weight percent benzene, when a high purity cyclohexane product is desired. The various benzene feed streams which can be employed in the practice of the invention can be obtained from any suitable source. For example, mixtures of hydrocarbons containing from about 20 to about 80 volume percent benzene can be obtained from various petroleum refinery operations. Such mixtures of hydrocarbons contain hydrocarbons having boiling points close to the boiling point of benzene, e.g.,

| | °F. |
|---|---|
| Methylcyclopentane | 161.3 |
| 2,2-dimethylpentane | 174.5 |
| Benzene | 176.2 |
| 2,4-dimethylpentane | 176.9 |
| Cyclohexane | 177.3 |
| 3,3-dimethylpentane | 186.9 |
| 2,3-dimethylpentane | 193.6 |

Such mixtures can be used as the benzene feed stream and the cyclohexane product recovered in concentrated form from the reactor effluent by distillation. If desired, depending upon the equipment available and the integration of the hydrogenation process with other refinery operations, such a feed mixture can be concentrated with respect to the benzene before being charged to the hydrogenation unit. However, because of the presence of the hydrocarbons having boiling points close to the boiling point of benzene, it is not possible to concentrate either the benzene containing feed stream or the cyclohexane product stream sufficient to produce a high purity cyclohexane, e.g., 99.0 weight percent, preferably 99.5 weight percent cyclohexane which is desired for some uses, such as in the manufacture of nylon. In other words, if there is an appreciable amount of other hydrocarbons such as those named above having boiling points close to the boiling point of benzene, said hydrocarbons will be present in the cyclohexane product when the only means of separation employed is distillation.

However, processes are available whereby high purity benzene can be recovered from petroleum fractions. This can be done on a commercial scale by a combination of distillation and extraction techniques. In such a process a hydrocarbon fraction is separated which contains benzene and other hydrocarbons boiling in the benzene range. This fraction can be taken so that benzene is the only aromatic compound present. The benzene-containing fraction is then subjected to solvent extraction using a suitable solvent which is highly selective for aromatics and will selectively extract the benzene, leaving the other hydrocarbons. The benzene thus extracted is readily recovered from the solvent by dstillation. Benzene obtained by such methods is essentially pure having a benzene content of at least 99.0, usually 99.5, weight percent or higher. It is also within the scope of the invention to employ high purity benzene from other sources.

Since a wide variety of catalysts can be employed in the practice of the invention, it is not intended to limit the invention to any particular catalyst. Any suitable hydrogenation catalyst can be employed. Catalysts suitable for use in the practice of the invention are those which are capable of causing the hydrogenation of benzene to cyclohexane. Examples of such catalysts include, among others, the following: nickel, platinum, palladium, iron, Raney nickel, etc. These materials are generally finely divided and are composited with a porous support or carrier such as the various forms of alumina, silica, alumina-silica coprecipitate, kieselguhr, diatomaceous earth, magnesia, zirconia, or other inorganic oxides, either alone or in combination. Many forms of such catalysts are available commercially. A presently preferred catalyst for use in the practice of the invention is nickel composited with kieselguhr.

The hydrogen employed in the practice of the invention can be obtained from any suitable source. Said hydrogen can be either electrolytic hydrogen of high purity or can be a hydrogen-containing stream recovered from catalytic reforming operations, or other petroleum refining operations. In order to maintain the catalyst at a high level of activity the hydrogen-containing stream recovered from said reforming or other operations is usually scrubbed with a strong caustic solution or passed through a bed of flake caustic (NaOH) to remove sulfur compounds. It is also preferred to remove the $C_4$ and heavier hydrocarbon materials contained in such streams by contacting the gas stream with a suitable absorbent as in conventional absorption processes.

The following description of the drawing and specific example will serve to more fully explain the invention. Said drawing is a diagrammatic flow sheet and illustrates a presently preferred embodiment of the invention. It is to be understood that many valves, pressure gauges, pumps, etc., not necessary for explaining the invention to those skilled in the art, have been omitted so as to simplify said drawing. Also, while the description of said drawing is in terms of and is combined with a specific example, it is to be understood that the invention is not limited to said specific example. The description of the drawing has been combined with the specific example solely in the interests of brevity.

*Example*

Referring now to said drawing, a feed stream comprising benzene at a temperature within the range of about 50 to about 150° F. is introduced via conduit 10 and is then divided into three approximately equal portions in conduits 11, 12, and 13. The amount of benzene flowing through said conduits 11, 12, and 13 is controlled by flow controllers 14, 16, and 17, respectively, operatively connected to the motor valves in said conduits as shown. A cyclohexane diluent stream (obtained from a source described hereinafter) in conduit 18 is divided into three portions in conduits 19, 21, and 22. A stream of compressed hydrogen-containing gases, essentially sulfur free, is introduced via conduit 23, is combined with the portion of benzene feed stream in conduit 11, and passed into conduit 24 wherein it is mixed with the portion of cyclohexane diluent from conduit 19. The resulting mixture comprising benzene, cyclohexane, and hydrogen is passed through preheater 26, here shown to be an indirect heat exchanger but which can be any suitable type of heating means, and is therein heated to a temperature of about 300° F. It is within the scope of the invention to employ the effluent from the final reactor as heat exchange medium in said heat exchanger 26 to obtain at least a portion of the desired increase in temperature.

The preheated feed mixture in conduit 24 is then introduced into a first reactor 27 wherein it contacts a bed of nickel on kieselguhr catalyst. Said reactor 27 is operated at a pressure of about 480 p.s.i.a. A reaction mixture effluent comprising cyclohexane and hydrogen is withdrawn from said reactor 27 at a final reaction temperature of about 500° F. via outlet conduit 28. Temperature recorder 29 is provided for recording the temperature of said reactor effluent.

Said reactor effluent is mixed in conduit 28 with a second portion of cyclohexane diluent from conduit 21 and the resulting mixture is then passed into conduit 31 where it is mixed with a second portion of the benzene feed stream from conduit 12. The resulting mixture is then introduced into the top of a second reactor 32 at a temperature of about 350° F. Said conduits 28 and 31 thus comprise a transfer conduit between said reactors 27 and 32. The amount of cyclohexane diluent flowing through said conduit 21 is controlled by means of motor valve 33 actuated by flow controller 34 which in turn is reset by temperature controller 35 responsive to the temperature of the mixture in said conduit 31 at a point therein, preferably just prior to its entry into said reactor 32.

A second reactor effluent having a composition similar to the effluent from reactor 27 and comprising cyclohexane and hydrogen is withdrawn from said reactor 32 at a final reaction temperature of about 500° F. via outlet conduit 36. Temperature recorder 37 is provided for recording the temperature of said effluent from reactor 32. A third portion of cyclohexane diluent from conduit 22 is mixed with the reactor effluent in conduit 36 and the resulting mixture is then introduced into conduit 38 where it is mixed with a third portion of the benzene feed stream from conduit 13. The resulting mixture at a temperature of about 350° F. is then introduced into the upper portion of a third reactor 39. Said conduits 36 and 38 thus form a transfer conduit connecting said reactors 32 and 39. The amount of said third portion of cyclohexane diluent flowing through conduit 22 is controlled by means of motor valve 41 actuated by flow controller 42 which in turn is reset by temperature controller 43 responsive to the temperature of the contents in said conduit 38, preferably just prior to its entry into said reactor 39.

A third reactor effluent having a composition similar to the effluent from reactors 27 and 32 and comprising a mixture of hydrogen and cyclohexane is withdrawn from said reactor 39 at a final reaction temperature of about 500° F. via outlet conduit 44. Temperature recorder 46 is provided for recording the temperature of said reactor effluent. Said reactor effluent in conduit 44 is passed through cooler 47 wherein its temperature is reduced to a temperature within the range of about 50 to about 150° F., preferably about 100° F. As mentioned, the reactor effluent in conduit 44 can be passed through said feed preheater 26 to recover a portion of the heat therein prior to passing said effluent through said cooler 47. The cooled effluent is then passed into a flash separator 48 wherein a liquid phase and a gaseous phase are separated. Said gaseous phase, which has a high hydrogen content but which also contains some low boiling hydrocarbons originally present in the hydrogen introduced via conduit 23, is withdrawn from separator 48 via conduit 49. Said flash separator 48 is conveniently operated at a pressure of about 425 p.s.i.a. and a temperature of about 100° F. At least a portion of the gaseous phase in said conduit 49 is discharged from the system via conduit 54 so as to control the accumulation or buildup of "inerts," e.g., methane and ethane. The amount of said gaseous phase so discharged is controlled by flow controller 56 in known manner. At least a portion of the gaseous phase from conduit 49 is passed via conduit 51, compressed in compressor 52, and then combined as recycle hydrogen with the fresh or make-up hydrogen originally introduced via conduit 23. The amount of said recycle hydrogen flowing through conduit 51 and compressor 52 is recorded in known manner by flow recorder 53. Pressure controller 57, operatively connected into flash separator 48 in known manner, and also operatively connected to flow controller 58 in conduit 23 resets said flow controller 58 and maintains a proper relationship between the amount of make-up or fresh hydrogen from conduit 23 and the amount of recycle hydrogen in conduit 51. Pressure controller 59, operatively connected into conduit 23, maintains a suitable back pressure in said conduit 23.

The liquid phase in flash separator 48 comprises the raw cyclohexane product of the process. Said liquid phase is withdrawn from flash separator 48 via conduit 18 and portions thereof, controlled by said flow controllers 15, 34, and 42, are utilized as the cyclohexane diluent as previously described.

The remainder of said raw cyclohexane product is passed via conduit 61 and preheater 62 wherein it is heated to a temperature of about 215° F., and then into cyclohexane stabilizer 63 which can comprise a conventional fractionating column provided with reboiler heating means 64 in the bottom thereof which supplies the necessary heat for the operation of said stabilizer. Overhead vapors are removed from said stabilizer via conduit 66, passed through condenser 67 wherein a portion is condensed, and then into accumulator 68. The liquid in accumulator 68 is returned to said stabilizer as reflux and serves to maintain reflux conditions in said stabilizer in known manner. Gases are withdrawn from said accumulator 68 via conduit 69, controlled by pressure controller 71 in known manner, and mixed with the gases in conduit 54 for utilization as fuel gas from conduit 54' or other use. The stabilized cyclohexane product of the process is withdrawn from stabilizer 63 via conduit 72 and cooler 73 and then passed to storage.

The various flow rates employed in the above-described example are given below in Table I where the stream numbers refer to the line or conduit numbers shown in the drawing. In said Table I all flow rates are given in mols per hour.

TABLE I.—STREAM NO. AND COMPOSITION—MOLS PER STREAM HOUR

| Component | 23 | 19 | 51 | 11 | 24 | 28 | 21 | 12 | 31 | 36 | 22 |
|---|---|---|---|---|---|---|---|---|---|---|---|
| Hydrogen | 467.3 | 2.4 | 600.2 | 0. | 1,069.9 | 921.7 | 1.3 | 0. | 923.0 | 774.8 | 1.3 |
| Methane | 16.5 | 12.4 | 267.0 | 0. | 295.9 | 295.9 | 6.8 | 0. | 302.7 | 302.7 | 6.8 |
| Ethane | 8.5 | 11.3 | 53.8 | 0. | 73.6 | 73.6 | 6.2 | 0. | 79.8 | 79.8 | 6.2 |
| Propane | 10.8 | 16.5 | 31.9 | 0. | 59.2 | 59.2 | 9.0 | 0. | 68.2 | 68.2 | 9.0 |
| i-Butane | 3.1 | 5.0 | 5.3 | 0. | 13.4 | 13.4 | 2.8 | 0. | 16.2 | 16.2 | 2.8 |
| n-Butane | 0.9 | 1.4 | 1.2 | 0. | 3.5 | 3.5 | 0.8 | 0. | 4.3 | 4.3 | 0.8 |
| i-Pentane | 0.4 | 0.7 | 0.2 | 0. | 1.3 | 1.3 | 0.4 | 0. | 1.7 | 1.7 | 0.4 |
| Cyclohexane | 0. | 251.2 | 20.2 | 0. | 271.4 | 320.8 | 137.2 | 0. | 458.0 | 507.4 | 137.2 |
| Benzene | 0. | 0. | 0. | 49.4 | 49.4 | 0. | 0. | 49.4 | 49.4 | 0. | 0. |
| Total | 507.5 | 300.9 | 979.8 | 49.4 | 1,837.6 | 1,689.4 | 164.5 | 49.4 | 1,903.3 | 1,755.1 | 164.5 |

| Component | 13 | 38 | 44 | 49 | 54 | 18 | 61 | 69 | 72 | 54' |
|---|---|---|---|---|---|---|---|---|---|---|
| Hydrogen | 0. | 776.1 | 627.6 | 612.2 | 21.0 | 6.4 | 1.4 | 1.4 | 0. | 22.4 |
| Methane | 0. | 309.5 | 309.5 | 276.2 | 9.2 | 33.3 | 7.3 | 7.3 | 0. | 16.5 |
| Ethane | 0. | 86.0 | 86.0 | 55.6 | 1.8 | 30.4 | 6.7 | 6.7 | 0. | 8.5 |
| Propane | 0. | 77.2 | 77.2 | 33.0 | 1.1 | 44.2 | 9.7 | 9.7 | 0. | 10.8 |
| i-Butane | 0. | 19.0 | 19.0 | 5.4 | 0.1 | 13.6 | 3.0 | 3.0 | 0. | 3.1 |
| n-Butane | 0. | 5.1 | 5.1 | 1.3 | 0.1 | 3.8 | 0.8 | 0.8 | 0. | 0.9 |
| i-Pentane | 0. | 2.1 | 2.1 | 0.2 | 0. | 1.9 | 0.4 | 0.3 | 0.1 | 0.3 |
| Cyclohexane | 0. | 644.6 | 694.1 | 20.8 | 0.6 | 673.3 | 147.7 | 0.6 | 147.1 | 1.2 |
| Benzene | 49.5 | 49.5 | 0. | 0. | 0. | 0. | 0. | 0. | 0. | 0. |
| Total | 49.5 | 1,969.1 | 1,820.6 | 1,013.7 | 33.9 | 806.9 | 177.0 | 29.8 | 147.2 | 63.7 |

From the above it is seen that no cooling or heat removal equipment is employed in the process of the invention between the inlet of reactor 27 and the outlet of final reactor 39. Thus, in the entire process from the inlet of first reactor 27 to the outlet of final reactor 39 no heat is added or removed except that which passes in or out via the process streams. This represents a marked advantage, not only in reduction of initial investment costs and maintenance costs of equipment as pointed out above, but also provides processing advantages because of the more uniform heat control.

In the practice of the invention, the operating conditions in reactors 27, 32, and 39 can vary over relatively wide ranges. However, said operating conditions are interrelated and when changing one variable consideration must be given to the effect on other variables. As indicated above, the reaction can be carried out at temperatures within the range of about 300 to about 600° F., preferably about 400 to about 500° F. The maximum desirable increase in temperature on the process stream through any reactor is about 300° F., preferably about 150 to about 200° F. The actual temperatures employed in said reactors will depend to some extent on the particular type of catalyst employed. More active catalysts make possible employing lower temperatures.

The pressure employed in said reactors 27, 32, and 39 is preferably from about 300 to about 500 p.s.i.a. Said pressures are not particularly critical. Pressure is employed primarily to increase the concentration or partial pressure of the hydrogen and thus aid the progress and completion of the primary reaction and minimize or eliminate side reactions. Thus, the above preferred pressures are those which have been found particularly suitable from a practical operating standpoint but are in no way critical or limiting upon the broad scope of the invention.

The amount of hydrogen present in the system is sufficient to provide a mol ratio of hydrogen to benzene within the range of about 4:1 to 50:1, preferably about 9:1 as a minimum.

The average space velocity (liquid basis) in the hydrogenation reactors can vary over a relatively wide range of from about 1 to 8, preferably about 2.5 to 4, volumes of benzene plus cyclohexane diluent per volume of catalyst per hour.

While the invention has been described in terms of employing a plurality of reactors comprising three reactors, it will be understood that said plurality of reactors can be less, e.g., 2, or more, e.g., 4, or more, reactors. Modification of the system illustrated in the drawing to employ less than or more than three reactors will be apparent to those skilled in the art in view of this disclosure. For example, if only two reactors are employed outlet conduit 36 would be connected to conduit 44 and reactor 39 isolated from the system by means of suitable valves in the various conduits leading to and from said reactor 39, or eliminated entirely. The actual number of reactors employed in a given system will depend upon a number of factors including desired stream day capacity, purity of benzene feed stock, purity of cyclohexane product desired, amount of hydrogen recycle, amount of cyclohexane diluent recycle, and others. In general, we have found a system employing three reactors as described above to be quite flexible and adapted to accommodate a wide variety of processing conditions.

Also, while the invention has been described in terms of introducing equal amounts of benzene into the individual reactors of the system, it is within the scope of the invention to introduce unequal amounts of benzene into the individual reactors. The amount of benzene introduced into a reactor determines, to a large extent, the amount of exothermic reaction taking place and a measure of temperature control can be obtained by regulating the amount of benzene introduced. However, in general, we have found that effecting temperature control by regulating the quantity of benzene introduced into the individual reactors to be less efficient and thus unsatisfactory. Thus, in the preferred embodiment of the invention we prefer to introduce approximately equal amounts of benzene into the individual reactors and introduce an amount of cyclohexane diluent into each reactor which is sufficient to obtain the desired temperature control. For obvious reasons said cyclohexane diluent is preferably supplied as recycled cyclohexane product. However, it is within the scope of the invention to employ cyclohexane of the required purity from any other available source as said diluent.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for the production of cyclohexane, which process comprises: contacting a mixture comprising benzene, an excess of hydrogen, and cyclohexane diluent with a hydrogenation catalyst under hydrogenating conditions in a plurality of contacting zones, said hydrogen being passed in series flow through each of said contacting zones, individual portions of said benzene being passed in parallel into individual contacting zones of said plurality of contacting zones, and individual portions of said cyclohexane diluent being passed in parallel into individual contacting zones of said plurality of contacting zones; regulating the amount of cyclohexane diluent thus supplied to each of said contacting zones to control the temperature therein so that the temperature in each of said contacting zones does not exceed about 600° F.; withdrawing resulting reaction mixture effluent containing the unreacted portion of said hydrogen from each of said contacting zones; passing said effluent from each of said contacting zones except the last contacting zone to a succeeding contacting zone without separation of unreacted hydrogen therefrom; and recovering cyclohexane product from the effluent from said last contacting zone.

2. A process according to claim 1 wherein said individual portions of benzene are approximately equal in amount.

3. A process for the production of cyclohexane, which process comprises: contacting a mixture comprising benzene, an excess of hydrogen, and cyclohexane diluent with a hydrogenation catalyst under hydrogenating conditions in a plurality of contacting zones at an initial reaction temperature within the range of from about 300 to about 400° F., said hydrogen being passed in series flow through each of said contacting zones, approximately equal individual portions of said benzene being passed in parallel into individual contacting zones of said plurality of contacting zones, and individual portions of said cyclohexane diluent being passed in parallel into individual contacting zones of said plurality of contacting zones; withdrawing effluent containing the unreacted portion of said hydrogen from each of said contacting zones at a temperature within the range of from about 450 to about 600° F.; regulating the amount of cyclohexane diluent thus supplied to each of said contacting zones to control the temperature therein so as to maintain the temperature of said effluents within said range of from about 450 to about 600° F.; passing said effluent from each of said contacting zones except the last contacting zone to a succeeding contacting zone without separation of unreacted hydrogen therefrom; and recovering cyclohexane product from the effluent from said last contacting zone.

4. A process for the production of cyclohexane, which process comprises, in combination, the steps of:

(1) dividing a feed stream comprising benzene into a plurality of approximately equal individual portions;

(2) passing said individual portions of said benzene feed stream individually at an initial reaction temperature within the range of from about 300 to about 400° F. in parallel into individual hydrogenation zones of a corresponding plurality of hydrogenation zones, each of said hydrogenation zones containing a hydrogenation catalyst;

(3) dividing a diluent stream comprising cyclohexane into a corresponding plurality of individual portions;

(4) passing said individual portions of said cyclohexane diluent stream individually in parallel into individual hydrogenation zones of said plurality of hydrogenation zones;

(5) passing a gas stream comprising an excess of hydrogen into the first hydrogenation zone of said plurality of hydrogenation zones and in said first hydrogenation zone, hydrogenating benzene to cyclohexane in the presence of said catalyst;

(6) withdrawing reaction mixture effluent at an elevated final reaction temperature not exceeding about 600° F. from said first hydrogenation zone;

(7) passing said effluent into a succeeding hydrogenation zone of said plurality of hydrogenation zones together with said portion of said benzene feed stream and said portion of said cyclohexane diluent passed thereto, the amount of said cyclohexane diluent being an amount sufficient to reduce the temperature of said effluent to said initial reaction temperature;

(8) repeating said steps (6) and (7) for said succeeding hydrogenation zone and any further succeeding hydrogenation zones which succeed said first mentioned succeeding hydrogenation zone except the last hydrogenation zone in said plurality of hydrogenation zones, whereby said individual portions of said benzene feed stream and said individual portions of said cyclohexane diluent stream pass through said individual hydrogenation zones of said plurality of hydrogenation zones in parallel and said hydrogen passes through said plurality of hydrogenation zones in series; and (9) recovering cyclohexane product from the effluent from the last hydrogenation zone of said plurality of hydrogenation zones.

5. A process for the production of cyclohexane, which process comprises, in combination, the steps of:

(1) dividing a feed stream comprising benzene into approximately equal first, second, and third portions;

(2) mixing said first portion of said feed stream with a gas stream comprising an excess of hydrogen and with a first portion of cyclohexane diluent and passing the resulting mixture into a first hydrogenation zone at an initial reaction temperature within the range of from about 300 to about 400° F.;

(3) in said first hydrogenation zone, forming cyclohexane by reacting benzene and hydrogen under hydrogenation conditions in the presence of a catalyst capable of catalyzing the hydrogenation of benzene;

(4) withdrawing a first effluent comprising hydrogen and cyclohexane at an elevated final reaction temperature within the range of from about 400 to about 500° F. from said first hydrogenation zone;

(5) passing said first hydrogenation zone effluent into a second hydrogenation zone together with said second portion of said benzene feed stream and a second portion of cyclohexane diluent, the amount of said second portion of cyclohexane diluent being an amount sufficient to reduce the temperature of said first effluent to an initial reaction temperature within the range of from about 300 to about 400° F.;

(6) in said second hydrogenation zone, forming additional cyclohexane by reacting benzene and hydrogen under hydrogenating conditions in the presence of a catalyst capable of catalyzing the hydrogenation of benzene;

(7) withdrawing a second hydrogenation zone effluent comprising hydrogen and cyclohexane at an elevated final reaction temperature within the range of from about 400 to about 500° F. from said second hydrogenation zone;

(8) passing said second hydrogenation zone effluent into a third hydrogenation zone together with said third portion of said benzene feed stream and another portion of cyclohexane diluent, the amount of said cyclohexane diluent being an amount sufficient to reduce the temperature of said second hydrogenation zone effluent to an initial reaction temperature within the range of from about 300 to about 400° F.;

(9) in said third hydrogenation zone, forming additional cyclohexane by reacting benzene and hydrogen under hydrogenating conditions in the presence of a catalyst capable of catalyzing the hydrogenation of benzene;

(10) withdrawing a third hydrogenation zone effluent comprising hydrogen and cyclohexane at an elevated final reaction temperature within the range of from about 400 to about 500° F. from said third hydrogenation zone;

(11) and recovering cyclohexane product from said third hydrogenation zone effluent.

6. A process according to claim 5 wherein a third hydrogenation zone effluent is cooled, passed to a flash separation zone, and a portion of the liquid phase comprising cyclohexane product from said separation zone is passed to said first, second, and third hydrogenation zones as said cyclohexane diluent.

7. A process according to claim 6 wherein the mol ratio of hydrogen to benzene is within the range of from 4:1 to 50:1.

References Cited by the Examiner

UNITED STATES PATENTS

| | | | |
|---|---|---|---|
| 2,456,633 | 12/1948 | Haensel | 260—667 |
| 2,833,698 | 6/1958 | Patton et al. | 208—210 |
| 2,934,573 | 4/1960 | Paulsen et al. | 260—667 |

DELBERT E. GANTZ, *Primary Examiner.*

S. P. JONES, *Assistant Examiner.*